(12) United States Patent
Mayr

(10) Patent No.: US 10,175,001 B2
(45) Date of Patent: Jan. 8, 2019

(54) VENTILATION DEVICE FOR TRANSMISSIONS WITH LUBRICANT COMPRISING WATER

(71) Applicant: MAGNA STEYR Fahrzeugtechnik AG & Co. KG, Graz (AT)

(72) Inventor: Franz Mayr, Graz (AT)

(73) Assignee: MAGNA STEYR Fahrzeugtechnik AG & Co. KG, Graz (AT)

(*) Notice: Subject to any disclaimer, the term of this patent is extended or adjusted under 35 U.S.C. 154(b) by 0 days.

(21) Appl. No.: 14/807,189

(22) Filed: Jul. 23, 2015

(65) Prior Publication Data

US 2015/0323259 A1 Nov. 12, 2015

Related U.S. Application Data

(62) Division of application No. 13/122,179, filed as application No. PCT/EP2009/062783 on Oct. 1, 2009, now abandoned.

(30) Foreign Application Priority Data

Oct. 1, 2008 (DE) .................. 10 2008 050 147
Oct. 1, 2008 (DE) .................. 10 2008 050 149

(51) Int. Cl.
*F28B 9/08* (2006.01)
*F16H 57/027* (2012.01)

(52) U.S. Cl.
CPC ............. *F28B 9/08* (2013.01); *F16H 57/027* (2013.01)

(58) Field of Classification Search
CPC .................................. F16H 57/027; F28B 9/08
See application file for complete search history.

(56) References Cited

U.S. PATENT DOCUMENTS 2,041,585 A   5/1936 Backstrom
2,350,197 A * 5/1944 Schneider ............... F01K 17/06
                                                       261/122.1

(Continued)

FOREIGN PATENT DOCUMENTS

CN      101245279 A    8/2008
DE        2220565 A1   1/1973

(Continued)

OTHER PUBLICATIONS

International Search Report for PCT/EP2009/062783, dated Jan. 21, 2010.
Chinese Office Action for CN 200980145506.9, dated Apr. 2, 2013.

*Primary Examiner* — Vicky A Johnson
(74) *Attorney, Agent, or Firm* — Bachman & LaPointe, PC

(57) ABSTRACT

A ventilation device for transmissions with lubricant comprising water, the device being disposed above the transmission (1) and being connected thereto by way of a line (10) and comprising a pressure equalization opening (13) that leads to the surrounding environment, is to operate without loss of evaporating water to the environment. To this end, the device comprises at least one container (17) designed as a condenser for evaporated water rising through the line (10), the container being provided with a cooling element for dissipating heat (15), the condensate passing from said container (17) back to the transmission (1). In one variant, two containers containing a fluid are described which communicate with one another by way of a U-shaped channel.

5 Claims, 3 Drawing Sheets

(56) References Cited

U.S. PATENT DOCUMENTS

| | | | |
|---|---|---|---|
| 2,844,129 A | 7/1958 | Beck, Jr. et al. | |
| 2,928,659 A | 3/1960 | Kinney | |
| 3,512,582 A | 5/1970 | Chu et al. | |
| 3,609,991 A | 10/1971 | Chu et al. | |
| 3,736,812 A | 6/1973 | Wellauer | |
| 3,886,748 A * | 6/1975 | Bronicki | F01K 9/00 165/104.25 |
| 4,027,728 A | 6/1977 | Kobayashi et al. | |
| 4,036,291 A * | 7/1977 | Kobayashi | H01L 23/427 165/104.21 |
| 4,363,216 A | 12/1982 | Bronicki | |
| 4,465,610 A | 8/1984 | Enjo et al. | |
| 5,129,482 A | 7/1992 | Warner et al. | |
| 5,205,848 A | 4/1993 | Blanc et al. | |
| 6,015,444 A | 1/2000 | Craft et al. | |
| 6,073,443 A | 6/2000 | Okada et al. | |
| 6,244,137 B1 | 6/2001 | Wigness | |
| 6,341,489 B1 | 1/2002 | Iida | |
| 6,474,405 B1 * | 11/2002 | Bell | F16H 57/0412 165/41 |
| 6,745,565 B1 | 6/2004 | Wahner et al. | |
| 6,779,421 B2 | 8/2004 | Arnold et al. | |
| 7,007,571 B1 | 3/2006 | Poplawski et al. | |
| 2005/0126749 A1 | 6/2005 | Matti et al. | |
| 2006/0086145 A1 | 4/2006 | Berninger et al. | |
| 2008/0194442 A1 | 8/2008 | Watts et al. | |
| 2009/0277298 A1 | 11/2009 | Mayr | |

FOREIGN PATENT DOCUMENTS

| | | | |
|---|---|---|---|
| DE | 69407096 T2 | 5/1998 | |
| DE | 202007018371 U1 | 7/2008 | |
| EP | 0629795 A1 | 12/1994 | |
| EP | 0939250 A2 | 9/1999 | |
| EP | 1964911 A2 | 9/2008 | |
| GB | 198635 A | 8/1923 | |
| GB | 736108 A | 8/1955 | |
| JP | 2006117521 A | 5/2006 | |
| JP | 2008-74974 A | 4/2008 | |
| WO | 2007/098523 A2 | 9/2007 | |
| WO | WO 2008095642 A1 * | 8/2008 | ........... F01K 23/065 |
| WO | WO 2012023027 A1 * | 2/2012 | ........... B01D 5/0051 |

* cited by examiner

VENTILATION DEVICE FOR TRANSMISSIONS WITH LUBRICANT COMPRISING WATER

CROSS-REFERENCE TO RELATED APPLICATIONS

This application is the divisional of U.S. patent application Ser. No. 13/122,179, filed Jun. 10, 2011, which is the U.S. national phase of International Application No. PCT/EP2009/062783, filed Oct. 1, 2009, which claims priority of DE 102008050149.2, filed Oct. 1, 2008 and DE 102008050147.6, filed Oct. 1, 2008.

BACKGROUND OF THE INVENTION

The invention relates to a ventilation device for transmissions with a lubricant containing water, wherein the ventilation device is connected to the transmission housing via a line and has a pressure equalization opening leading to the environment.

In oil-lubricated transmissions there is a ventilation opening, which allows pressure equalization with the environment when the temperature in the transmission rises or falls due to operating conditions and which is usually equipped as a device with installations for retaining oil mist and for keeping away dirt from the environment.

WO 2007/098523 A1 discloses a lubricant containing water, which in addition to a high proportion of water contains an agent lowering the freezing point, such as glycol, and further additives and/or suspended matters. Further details as well as the advantages to be obtained with such a lubricant can be gathered from the above-mentioned publication.

DE 22 20 565 discloses a recirculating cooling system for oil-lubricated reduction transmissions. A fan recirculates air containing oil vapors from inside the transmission through a heat exchanger back into the transmission. The condensed oil is returned separately. There is no pressure equalization with the environment.

Water has a very low vapor pressure in comparison to lubricating oil, so that it evaporates easily. This leads to the fact that not only the amount of lubricant in the transmission becomes less and less, which soon results in the destruction of the transmission, but also the composition of the lubricant changes because the proportion of water becomes smaller and smaller.

Thus it is the object underlying the invention to remedy this disadvantage and to counteract the loss of water to the environment.

SUMMARY OF THE INVENTION

According to the invention, this is achieved by the fact that the ventilation device comprises at least one container formed as a condenser to which evaporated water passes through the line, said container being provided for this purpose with means for dissipating heat, wherein the condensate passes from said container back to the transmission.

When the transmission is heated up due to operating conditions, the air which is present in the lubricant-free space expands and there is increased evaporation, so that a mixture of air and water vapor flows through the line into the evaporating device. In the evaporating device the water vapor is condensed and the air is allowed to escape into the environment. Thus a separation of air and water vapor and a condensation of the water vapor occur simultaneously with the pressure equalization.

Heat dissipation is required for the condensation, which heat dissipation is achieved in various ways. Either by a group of pipes mounted inside the at least one container and flown through by a suitable cooling agent or by cooling ribs arranged at the outside of the container, or a combination of both. If the transmission is part of a motor vehicle, the cooling ribs should be exposed to the air stream, if possible. This is easily possible due to the fact that the device does not need to be mounted at the transmission itself, but is connected thereto by a line. If the line continuously rises and its cross section is sufficiently dimensioned, it can at the same time serve as a return line for condensed water. In this way, only a single tube is required between the transmission and the device.

However, the device can also be arranged at the same height as or lower than the transmission. In these cases the line, at least in the container, leads downwards and ends below the level of the condensate. In this way, the condensate can be drawn back in the case of a pressure drop in the transmission.

In an advantageous further development of the invention, the device consists of two containers arranged essentially at the same geodetic height and containing a liquid, wherein the deepest points of the two containers communicate with one another via a U-shaped duct and wherein the line opens into one of the containers and the other container has the pressure equalizer opening at its top. The two containers are interconnected in the manner of a siphon. When the pressure changes in the transmission, the liquid is displaced in the siphon, wherein the levels of liquid in the two containers move apart from one another. Water vapor condenses in the liquid, wherein a part thereof flows back into the transmission when the level of liquid has increased sufficiently or the pressure in the transmission has dropped.

Previously to the initial operation, the siphon and the two containers are filled with such a large amount of liquid that their levels in this initial state reaches up to the orifice of the line. Due to this fact returning the condensate into the transmission becomes more even.

The liquid in the siphon and in the two containers can be water, an agent lowering the freezing point, for example, glycol or a mixture of both. Depending on the conditions and requirements, the one or the other is to be preferred. If no temperatures below the freezing point are to be expected, water is preferable because in this way the composition of the lubricating liquid in the transmission remains unchanged. Otherwise the agent lowering the freezing point is more advantageous.

In a further development of the invention, the space filled with liquid contains a porous material of high thermal conductivity. This improves heat transfer and condensation and prevents fluctuating of the levels of liquid in the two containers. As the porous material, in particular stainless steel wool has proved its worthiness.

DETAILED DESCRIPTION

Figure 1:
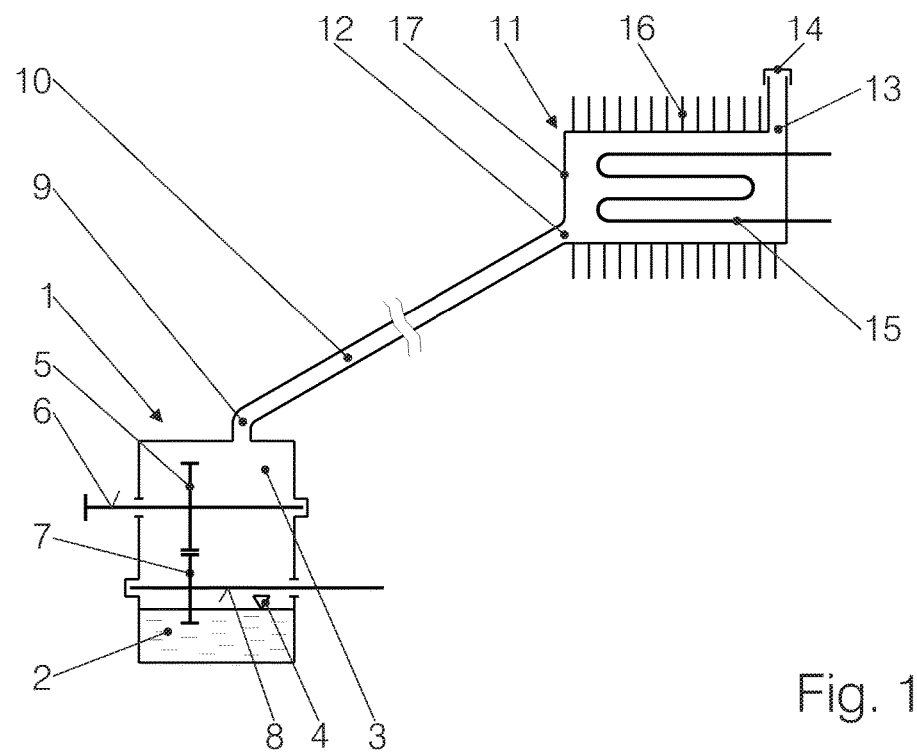
FIG. 1 schematic representation of the device according to the invention in a first embodiment.

In FIG. 1, a transmission is designated summarily with reference numeral 1 and a ventilation device according to the invention with reference numeral 11. As a simplifying example, the transmission 1 herein contains a driving shaft 6 having a gear 5 and a driven shaft 8 having a gear 7. Details which are common for transmissions, such as bearing and housing partition, are not elaborated on. In practice, it can be any transmission, such as the shift gearbox or the rear-axle transmission with differential of a motor vehicle.

The lower part of the transmission contains a lubricating liquid 2 having a level 4. The gear 7 immerges into the lubricating liquid 2. The upper region of the transmission 1 has an opening 9. Otherwise the transmission 1 is closed and thus has no flow connection with the environment. The lubricating liquid contains a considerable amount of water and is described in more detail in WO 2007/098523 A1. A line 10 leads steadily upwards from the opening 9 up to the ventilation device 11 according to the invention. In this case, the ventilation device 11 comprises a container 17, inside of which there is a cooling pipe coil 15. It is flown through by a preferably liquid cooling agent. Alternatively or additionally the container 17 can be provided with cooling ribs 16. The container 17 has an opening 13 at its highest point, which, as a conventional ventilation opening, protects against the intrusion of dirt with a cap 14.

By way of this simplest embodiment of FIG. 1, the basis of the function can be recognized. The water evaporating due to friction and heating in the transmission 1 (and, if applicable, further liquids present in the lubricant) rises via the line 10 into the ventilation device 11. There it condenses due to cooling, and the condensate flows back again into the transmission 1. Since the ventilation device 11 is a separate unit, it can also be arranged at some distance from the transmission, such as at a place where it is exposed to the air stream. In this case the cooling ribs are useful; otherwise dissipation of the condensation heat is primarily effected by the cooling pipe coil 15. Due to the opening 13 there is no change in pressure in the transmission or in the container 17.

Figure 2:
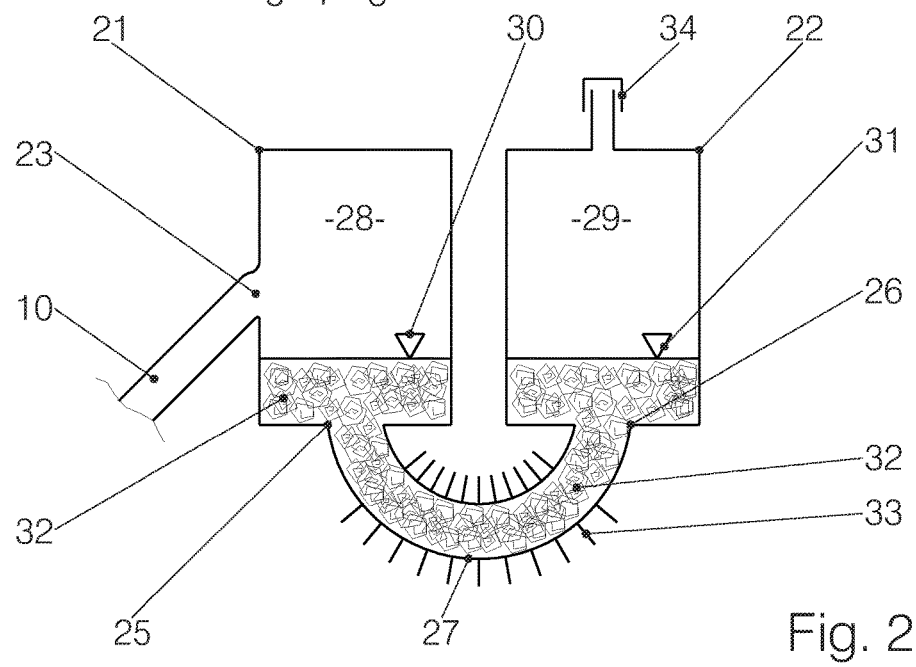
FIG. 2 schematic representation of the device according to the invention in a second embodiment, in its initial position.

In the embodiment of FIG. 2 the ventilation device is formed by two containers, a first container 21 and a second container 22, both essentially at the same geodetic height, thus side by side. The line 10 rising from the transmission opens into the first container 21 at a certain height (orifice 23). At its highest point the second container 22 has a conventional ventilation opening making the connection with the environment. The lowermost points 25, 26 of the two containers 21, 22 are interconnected via a U-shaped pipe 27, so that they form vessels communicating for a liquid.

The U-shaped pipe 27 and the lowermost regions of the two containers 21, 22 are filled with a liquid corresponding to the levels of liquid 30, 31. The spaces 28 and 29, respectively, on top of it contain air and water vapor. In the initial position shown in FIG. 2 (previously to the first operation of the transmission), both levels 30, 31 are equally high. Herein the level 30 is somewhat below the orifice 23 of the line 10. The liquid is one of the components of the lubricating liquid or the lubricant itself or a mixture of their components.

In addition to the filling of liquid, the U-shaped pipe 27 and the lower regions of the two containers 21, 22 still contain another filling 32 made of a porous material, which takes up and conducts heat well. Though this filling 32 is to allow the flow of the liquid between the two containers 21, 22, it dampens it. The main function of the filling 32 is to take up and dissipate heat, see further description of function hereinafter. Stainless steel wool has proven to be especially efficient for this purpose, not least due to its good thermal conductivity. The U-shaped pipe 27 can be additionally provided with cooling ribs 33.

Figure 3:
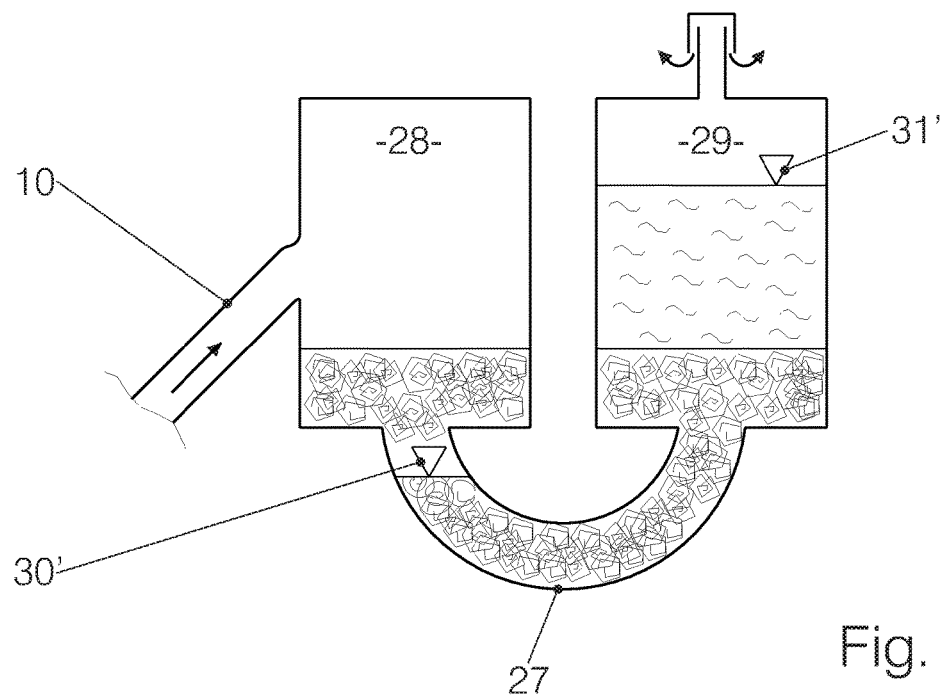
FIG. 3 like FIG. 2, when the transmission is heated up.

In order to explain the function, at first the transition from the initial state of FIG. 2 to the state of FIG. 3 will be described: During operation the transmission heats up and with it the lubricant, wherein the water contained therein begins to evaporate and the air/vapor mixture expands in the space above the lubricant. This causes the mixture to rise through the duct 10 into the space 28, in which the mixture at first displaces the liquid present there—causing the level 30 to decrease to 30'—and subsequently bubbles through the liquid in the U-shaped pipe 27. Herein the water vapor condenses—especially fast due to the fact that it touches the filling 32—, and the air reaches the second container 22. The air rises therein and exits—just as the air displaced by the risen level 31'—through the ventilation opening 34 into the environment. If the liquid in the U-shaped pipe 27 and in the lower regions of the two containers 21, 22 contains a substance lowering the freezing point (glycol or another superior-grade alcohol), this substance absorbs the water vapor, wherein its volume is increased, and mixes with the condensate. Thus the condensing effect of this arrangement is a multiple one.

Figure 4:
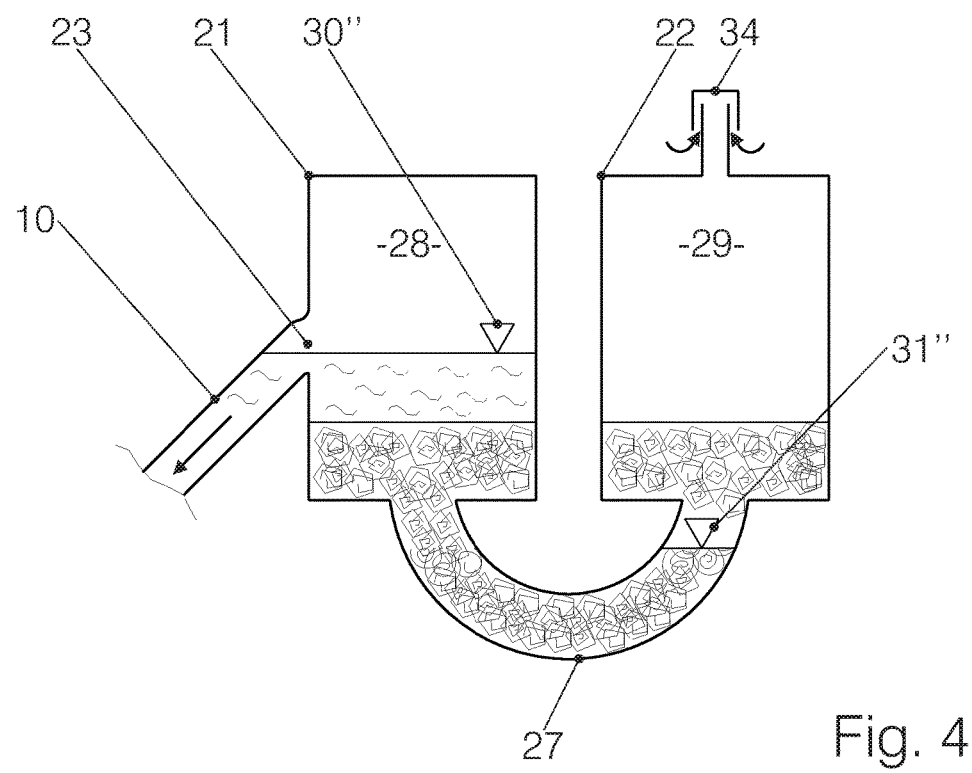
FIG. 4 like FIG. 2, when the transmission is cooled down.

In order to explain the function, furthermore the transition from the state of FIG. 3 to the state of FIG. 4 will be described: when the transmission is stopped, it cools down relatively quickly, and with it the air/vapor mixture present in the space 28 of the first container 21. Due to this fact a vacuum develops in the space 28, causing the level 30' in the first container 21 to rise to the level 30" and correspondingly the level 31' to decrease to the level 31". This is not impeded since air is able to flow in through the ventilation opening. However, the flow in the duct 27 is retarded by its filling 32 of steel wool. The rising level 30" in the first container 21 finally reaches the opening 23, in which the downwards leading line 10 opens into the container 21. Due to the fact that the volume of the filling of liquid has increased by absorbing water and mixing with water, the additional amount flows back into the transmission 1 through the line 10. This ensures that amount and mixing ratio of the total amount of liquid do not change.

Figure 5:
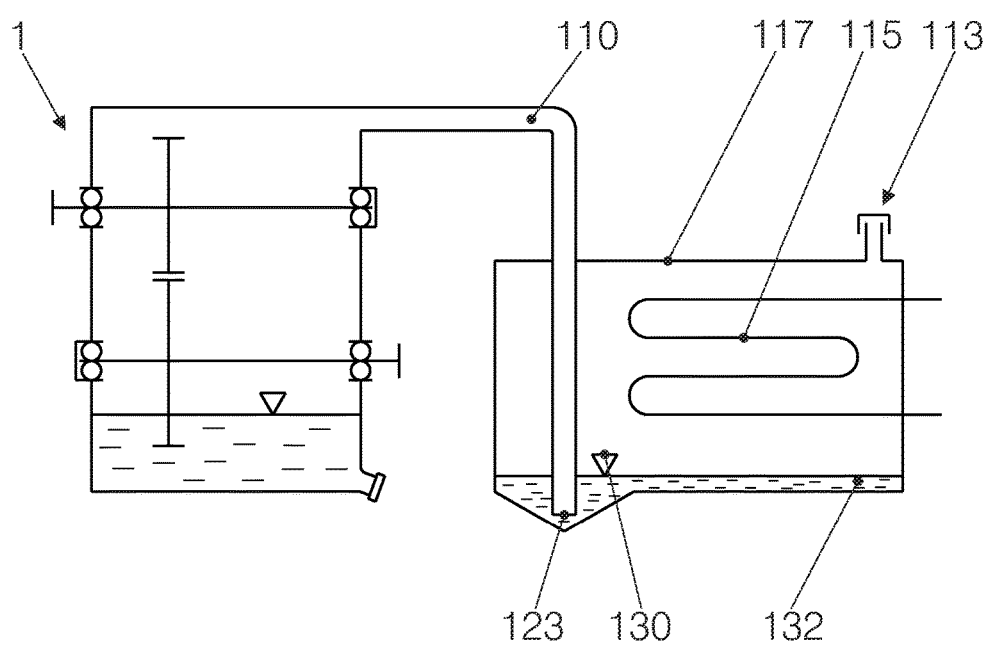
FIG. 5 schematic representation of the device according to the invention in a third embodiment.

The embodiment of FIG. 5 differs from the one of FIG. 1 in that the line 110 in the container 117 is led downwards far enough for its open end 123 to immerge into the condensed water 132. The end 123 lies below the level of liquid 130, so that, when the transmission is cooled down, condensate is drawn back into the transmission. Due to this fact there is great freedom in arranging the container 117. It can be placed in the vehicle such that it is exposed to the air stream, even near the ground.

Within the framework of the invention, the described embodiments can be modified in various ways; in particular, individual features thereof can be combined with one another.

The invention claimed is:

1. A transmission having a lubricant containing water, a ventilation device connected to the transmission via a line and having a pressure equalization opening which leads to the environment, the ventilation device comprises at least one container formed as a condenser for evaporated water flowing thereto through the line, said container being provided for this purpose with means for dissipating heat, wherein the container is at ambient pressure and wherein condensate passes from said container through the line back into the transmission, wherein the line is connected to the transmission at a point above a level of liquid in the transmission, and immerges into the container through an opening below a level of liquid present in the container.

2. The transmission according to claim 1, wherein the means for dissipating heat is a group of pipes mounted inside the at least one container and a suitable cooling agent flows through the group of pipes.

3. The transmission according to claim 1, wherein the means for dissipating heat are cooling ribs arranged at the outside of the one container.

4. The transmission according to claim 1, wherein an inlet to the line is above the level of liquid in the transmission, whereby evaporated water in the transmission can enter the inlet to the line as vapor.

5. The transmission according to claim 1, wherein the pressure equalization opening which leads to the environment allows air to pass from within the ventilation device to the environment.

* * * * *